Dec. 22, 1964     A. VAUGOYEAU     3,162,465

SUSPENSION SYSTEM FOR VEHICLES

Filed July 27, 1961     2 Sheets-Sheet 1

INVENTOR:
ALEXANDRE VAUGOYEAU

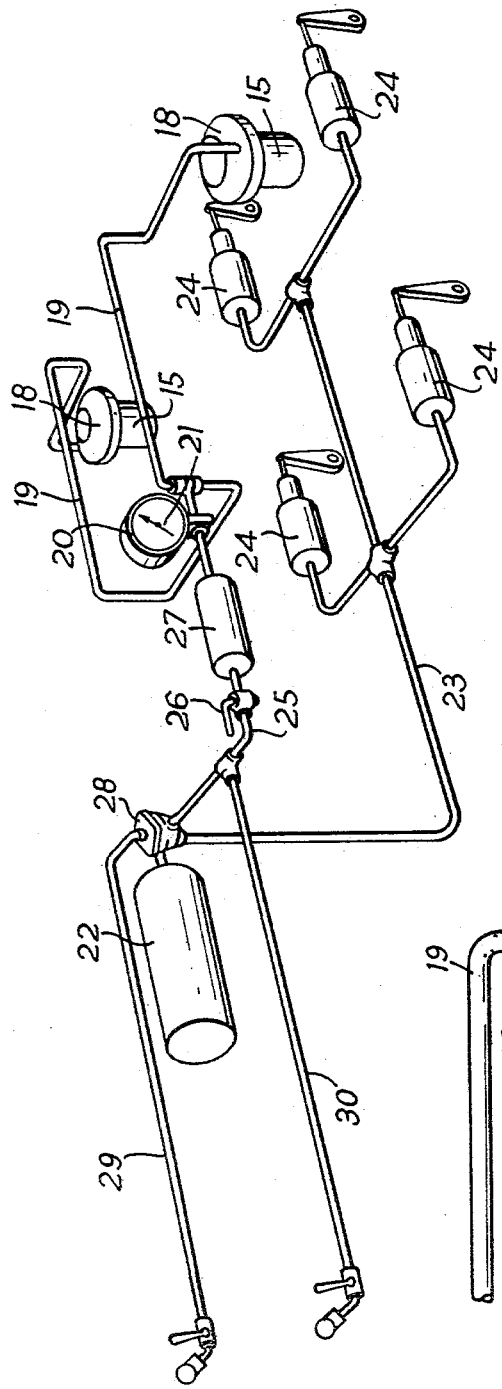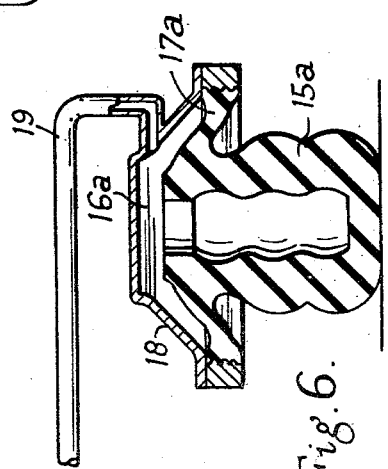

United States Patent Office 3,162,465
Patented Dec. 22, 1964

3,162,465
SUSPENSION SYSTEM FOR VEHICLES
Alexandre Vaugoyeau, Saint Marcel, Marseille, France
Filed July 27, 1961, Ser. No. 127,296
Claims priority, application France, July 29, 1960,
18,959, Patent 1,266,077
2 Claims. (Cl. 280—124)

In order to have acceptable road-holding, heavy vehicles must have a comparatively inflexible suspension under load, whilst in order to effect the return journey at high speed, it is desirable that the suspension should be flexible.

These two contradictory requirements have not been realized up to date.

The invention has the object of providing a suspension arrangement, adapted to solve this problem by combining the possibilities given by rubber springs with those afforded by compressed air springs.

It is characterized by the means used, either jointly or individually, and more particularly by a combination of compression springs, preferably of rubber in series arrangement, and of individual, inflatable pneumatic cushions, making it possible to obtain one flexibility control for travelling under load, and another, more flexible, flexibility control for travelling unloaded by means of cushions filled with compressed air.

The accompanying drawing shows, by way of example, one of the embodiments of the object of the invention.

FIG. 5 is a schematic perspective elevation to show the manner of feeding compressed air to the suspension from a conventional air-brake system.

FIG. 6 is a cross-section of a modified form of damper having a connecting pipe for compressed air and two of which are shown included in the air circuit of FIG. 5.

Figure 1:
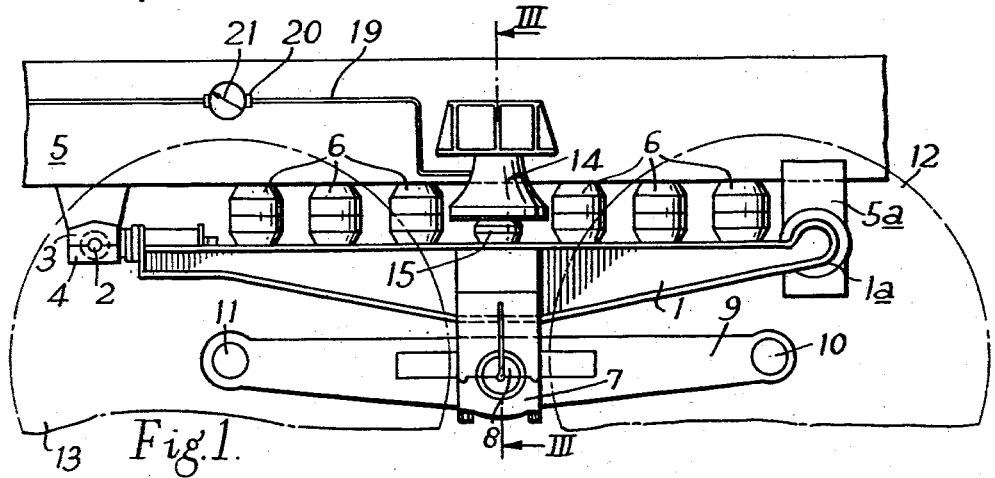
FIG. 1 is a side elevation of the suspension under load.
Figure 2:
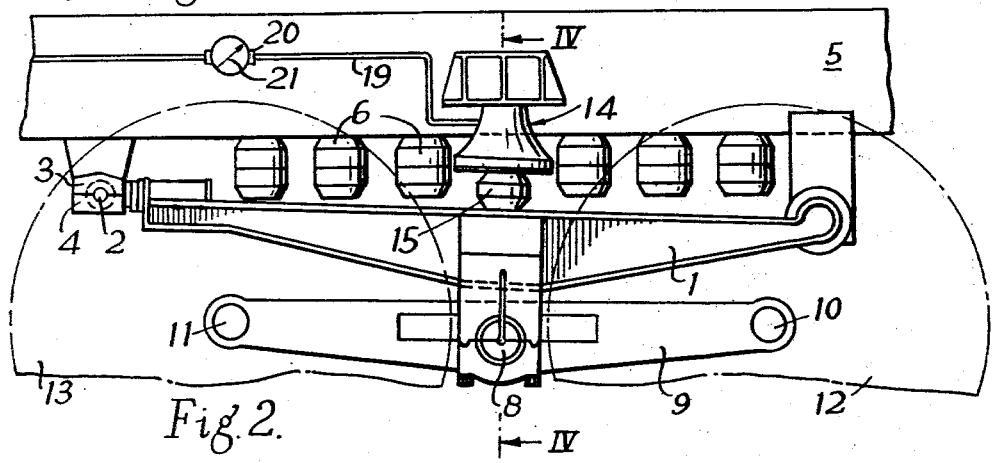
FIG. 2 is a side elevation of the suspension when not under load.
Figure 3:
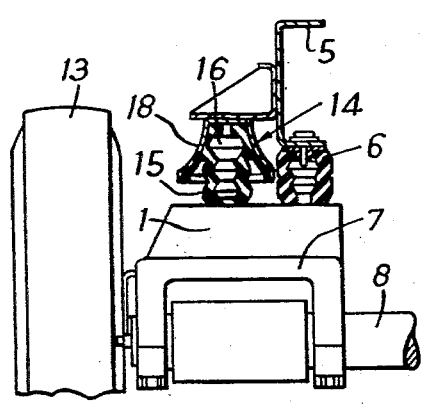
FIG. 3 is a section taken on the line III—III of FIG. 1.
Figure 4:
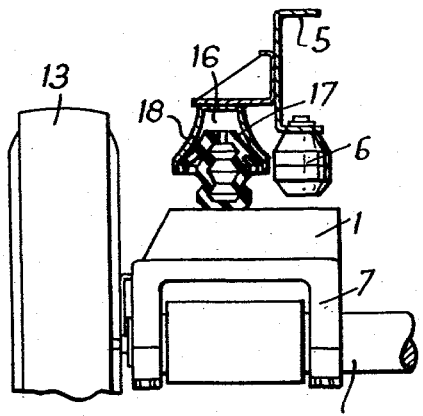
FIG. 4 is a section taken on the line IV—IV of FIG. 2.

The suspension is symmetrical for the wheels at both sides of the vehicle and only the suspension of one side of the vehicle is illustrated in the drawing.

The suspension comprises an arm 1 articulated at one end by a pivot 2 carried in bearings 3, 4 mounted under the chassis 5 of the vehicle. On the chassis 5 there is mounted a fixed vertical friction plate 5a against which there abuts a friction pad 1a carried on the free end of the arm 1, this arrangement serving both to provide a damping action of vertical oscillations of the arm 1 and to assist in keeping the arm 1 aligned horizontally with the chassis 5. The arm 1 can move towards and away from the chassis 5 by compressing to a greater or lesser extent a set of resilient dampers 6, preferably made of rubber, arranged in a row on the underside of the chassis 5. The dampers are compressed successively, according to the load imposed, and in the fully-laden state of the vehicle all of the dampers are equally compressed and the arm 1 lies parallel to the underside of the chassis 5. At the center of the arm 1 there is provided a fork 7 in which is mounted rotatably on axle 8 on which is pivoted a lever 9 at the two ends of which are mounted spindles 10 and 11 respectively carrying road wheels 12 and 13.

Between the chassis 5 and the fork 7 there is interposed a cushioning device 14. This device comprises a pad 15, which may be identical with the dampers 6, above which there is provided an air-tight pneumatic chamber 16 the lower deformable wall 17 of which, formed integrally with the pad 15, is capable of being deformed upwards under the effect of the load until the pad 15 rests against a dished cover 18 which forms one of the walls of the pneumatic chamber 16. Further, the deformable wall can be deformed downwardly by forcing compressed air into the chamber 16.

When the vehicle is under load, and if the air pressure present in the chamber 16 is insufficient to support that load, the pad 15 acts simply in the manner of another damper 6, and the suspension as a whole has only the resilient characteristics and flexibility which result from the interpositioning of all of the dampers and the pad 15 between the arm 1 and the chassis.

When the vehicle is not under load, the weight to be supported is relatively low and air under sufficient pressure in the chamber 16 can be made to cause the deformable wall 17 to be deformed downwardly and thereby leave the arm 1 supported, with respect to the chassis, only by the cushion 15 and not at all by the dampers 6. Accordingly, when the vehicle is not loaded, the suspension is by means of compressed air. When the vehicle is heavily or fully loaded, some or all of the dampers 6 are in operation and the suspension is by means of rubber.

For adjustment of the load-bearing characteristics of the cushioning device 14, it is possible to connect the chamber 16 of the cushion 15 to the compressed air supply of a conventional air brake system, by means of a pipe 19 having a calibrated valve 20 with a dial 21 graduated in kilogrammes weight.

FIG. 6 shows a modified cushion 15a which has a deformable top wall 17a by which it is connected to a cover 18a having the pipe 19 connected to its interior chamber 16a.

In order to regulate the air pressure in the chamber so as to obtain a convenient value, the road wheel is placed on a weighbridge, when the vehicle is not loaded, and the pointer of the valve 20 is set to the weight value shown by the weighbridge.

When the vehicle is heavily loaded, the pointer of the valve 20 is placed to zero, resulting in zero air feed to the chamber.

This suspension may be applied also to wheels in tandem arrangement and to single-axle suspensions.

The chamber 16 and the cushion 15 may be replaced by an inflatable balloon, and the dampers 6 may also be replaced by inflatable balloons.

In FIG. 5 the conventional brake air receiver 22 is connected through a duct 23 to a set of four brake operating cylinders 24. A further duct 25 leads to a hand-operable cock 26 controlling air supply to a suspension air receiver 27 which can feed air through the adjustable valve 20 to pass through the pipes 19 to the chambers 16 in the covers 18. Reference 28 indicates a conventional brake check valve, and references 29 and 30 respectively denote the conventional brake control pipe and the conventional brake general air pipe.

I claim:

1. A wheel suspension system in a vehicle comprising a first resiliently deformable solid compression support mounted between a vehicle axle and a vehicle chassis, said support being compressed by the axle and chassis only and always when the vehicle is under a first degree of loading and a second pneumatically inflatable support means comprising two engageable members fixed respectively one on said axle and one on said chassis, at least one member being deformable, said second support means preventing simultaneous contact of said first support means with both said axle and said chassis and retains an internal air cushion only when the vehicle is under a second degree of loading lighter than said first degree of loading, said second support means being entirely compressed and allowing said simultaneous contact of said first support means with said axle and chassis whenever the vehicle is under said first degree of loading.

2. In a system according to claim 1, means for adjusting the degree of resiliency of said second support means which comprises a valve for deflation under load and a coupling to a vehicle air brake system for controlled inflation when the vehicle is empty.

References Cited by the Examiner

UNITED STATES PATENTS

| | | |
|---|---|---|
| 820,707 | 5/06 | Downer. |
| 2,756,048 | 7/56 | Pfeiffer _____ 267—65 |
| 2,993,707 | 7/61 | Vaugoyeau _____ 280—124 |

FOREIGN PATENTS

| | | |
|---|---|---|
| 1,216,706 | 11/59 | France. |
| 204,578 | 10/23 | Great Britain. |
| 209,499 | 1/24 | Great Britain. |

A. HARRY LEVY, *Primary Examiner.*

LEO FRIAGLIA, *Examiner.*